(12) United States Patent  
Simoes et al.

(10) Patent No.: US 7,769,413 B2
(45) Date of Patent: *Aug. 3, 2010

(54) BATTERY CHARGING ASSEMBLY (75) Inventors: Felipe O. Simoes, Kitchener (CA); Colin N. Todd, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/360,418

(22) Filed: Jan. 27, 2009

(65) Prior Publication Data

US 2009/0137156 A1 May 28, 2009

Related U.S. Application Data (63) Continuation of application No. 10/807,791, filed on Mar. 24, 2004, now Pat. No. 7,489,952.

(60) Provisional application No. 60/457,030, filed on Mar. 24, 2003.

(30) Foreign Application Priority Data

Apr. 8, 2003 (GB) ................................ 0308141.1

(51) Int. Cl.
*H04B 1/38* (2006.01)
*H02J 7/00* (2006.01)
(52) U.S. Cl. ................... 455/573; 320/114; 320/112
(58) Field of Classification Search ................ 320/107, 320/108, 110, 112, 114, 357, 638, 374
See application file for complete search history.

(56) References Cited

U.S. PATENT DOCUMENTS

| 4,001,665 A | 1/1977 | Wisner et al. |
| 4,502,104 A | 2/1985 | Mitchell |
| 4,893,351 A | 1/1990 | McKee et al. |
| 5,138,351 A | 8/1992 | Wiegand et al. |
| 5,510,691 A | 4/1996 | Palatov |

(Continued)

FOREIGN PATENT DOCUMENTS

DE 201 16 332 U1 1/2002

(Continued)

OTHER PUBLICATIONS

Patent Abstracts of Japan, vol. 2000, No. 08, Oct. 6, 2000 & JP 2000 139032 A (Kyocera Corp.), May 16, 2000 (1 pg).

(Continued)

*Primary Examiner*—George Eng
*Assistant Examiner*—Nam Huynh
(74) *Attorney, Agent, or Firm*—Jones Day; Krishna K. Pathiyal; Robert C. Liang (57) ABSTRACT

A battery charging assembly for charging a battery of a mobile device includes a charging unit, an output assembly and an input assembly. The input assembly is detachably associated with the charging unit and includes an adapter for removable attachment to the charging unit, a power cord, and a plug configured to mate with a style of electrical outlet such that the charging unit is positionable at a remote location from the electrical outlet. The adapter has a latching mechanism for latching the adapter in a receptacle defined in the charging unit.

18 Claims, 11 Drawing Sheets

U.S. PATENT DOCUMENTS

| | | | |
|---|---|---|---|
| 5,613,863 A | 3/1997 | Klaus et al. | |
| 5,634,806 A | 6/1997 | Hahn | |
| 5,648,712 A * | 7/1997 | Hahn | 320/111 |
| 5,684,689 A | 11/1997 | Hahn | |
| 5,744,934 A | 4/1998 | Wu | |
| 5,791,921 A | 8/1998 | Lee | |
| 5,934,921 A | 8/1999 | Doong | |
| 6,039,608 A | 3/2000 | Amero et al. | |
| 6,064,177 A | 5/2000 | Dixon | |
| 6,086,395 A | 7/2000 | Lloyd et al. | |
| 6,109,977 A | 8/2000 | Baxter et al. | |
| 6,126,460 A | 10/2000 | Wu | |
| 6,160,378 A | 12/2000 | Helot et al. | |
| 6,265,845 B1 | 7/2001 | Bo et al. | |
| 6,320,353 B1 * | 11/2001 | Chiu et al. | 320/111 |
| 6,328,581 B1 | 12/2001 | Lee et al. | |
| 6,362,610 B1 | 3/2002 | Yang | |
| 6,371,535 B2 | 4/2002 | Wei et al. | |
| 6,385,468 B2 | 5/2002 | Arnold | |
| 6,568,943 B2 | 5/2003 | Okayasu et al. | |
| 6,592,386 B2 | 7/2003 | Teng et al. | |
| 6,664,762 B2 | 12/2003 | Kutkut | |
| 6,669,495 B2 | 12/2003 | Philips et al. | |
| 6,727,677 B1 | 4/2004 | Bouskila | |
| 6,753,671 B1 | 6/2004 | Harvey | |
| 6,762,584 B2 | 7/2004 | Harvey | |
| 6,774,603 B2 | 8/2004 | Liao | |
| 6,774,605 B2 * | 8/2004 | Usui et al. | 320/112 |
| 6,860,743 B2 | 3/2005 | Ekkul et al. | |
| 2002/0115480 A1 | 8/2002 | Huang | |
| 2002/0195993 A1 | 12/2002 | Chiu | |
| 2003/0117104 A1 | 6/2003 | Liao | |
| 2003/0117106 A1 | 6/2003 | Hwang | |
| 2003/0148663 A1 | 8/2003 | Hsin | |
| 2005/0085278 A1 | 4/2005 | Lin | |

FOREIGN PATENT DOCUMENTS

| | | |
|---|---|---|
| EP | 1 198 049 A1 | 4/2002 |
| GB | 2 361 115 A | 10/2001 |

OTHER PUBLICATIONS

Anonymous: "Wall plug charger with USB connector," Research Disclosure, Kenneth Mason Publications, Hampshire, GB, vol. 453, No. 5, Jan. 2002, XP007129542 (1 pg).

* cited by examiner

BATTERY CHARGING ASSEMBLY

CROSS-REFERENCE TO RELATED APPLICATIONS

This application is a continuation of U.S. patent application Ser. No. 10/807,791, filed Mar. 24, 2004, now U.S. Pat. No. 7,489,952, which issued on Feb. 10, 2009; which claimed priority to U.S. Provisional Application No. 60/457,030, filed Mar. 24, 2003 and which claimed priority to U.K. Application No. 0308141.1, filed Apr. 8, 2003. The disclosures of each of these applications are incorporated herein by reference in their entirety.

FIELD

This technology relates to a battery charging assembly. In particular, the technology concerns an adapter for a battery charger that is utilized in charging an electronic device.

BACKGROUND

Battery chargers for mobile communication devices often have a fixed wall plug that is integral with a charging unit, or a cable leading from a charging unit and terminating in a fixed wall plug. The cable may be permanently attached to the charging unit or may be a separate cable that is plugged into the charging unit.

Figure 1:
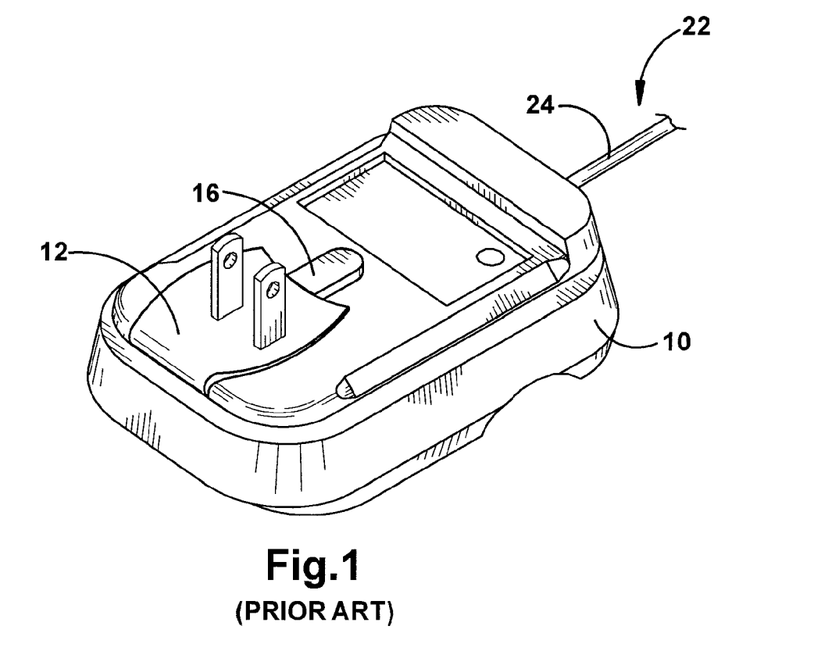
FIG. 1 is a bottom perspective view of a prior art battery charging unit having a interchangeable plug element.
Figure 2:
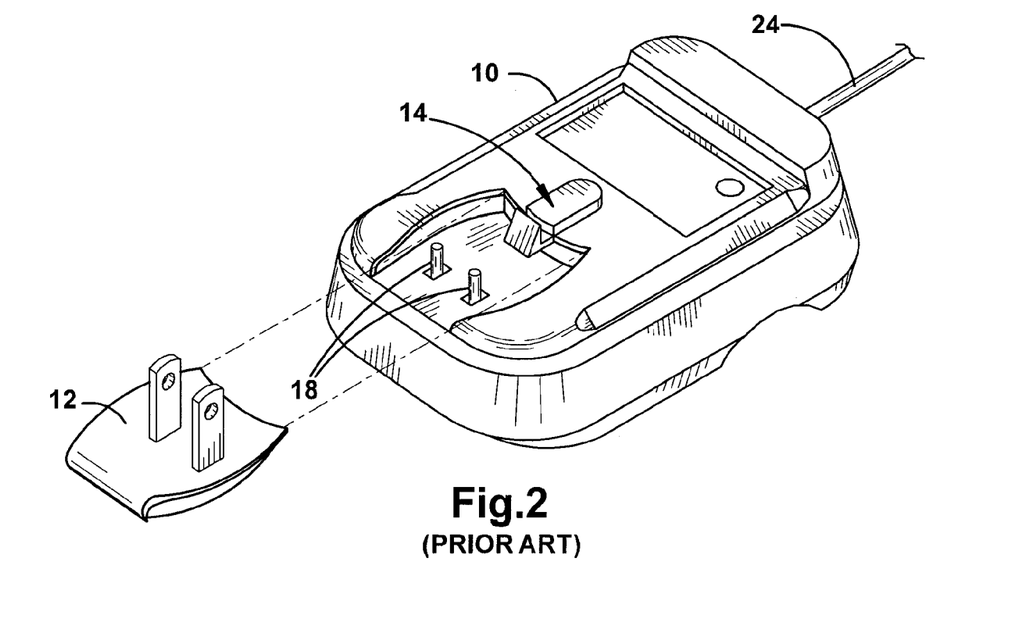
FIG. 2 is a bottom perspective view of the prior art battery charging unit of FIG. 1 with the adapter removed from the socket.
Figure 3:
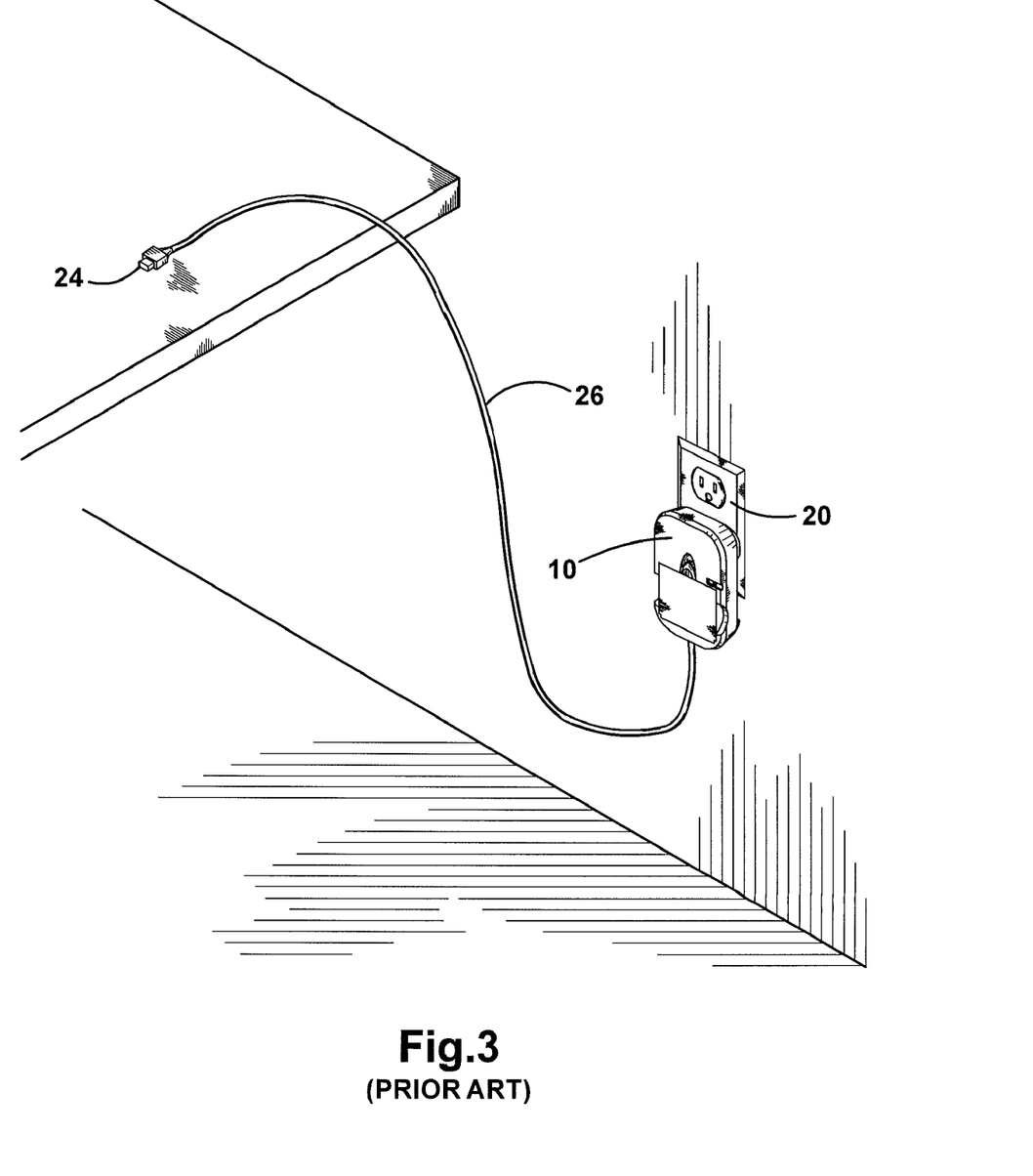
FIG. 3 is a perspective view of the prior art battery charging unit of FIG. 1 installed in an electrical wall socket.

One prior art charging unit 10, shown in FIGS. 1-3, is designed for use with different styles of electrical outlets so that a single charging unit 10 may be used in a number of different countries. Examples of different styles of electrical outlets include North American and European, among other known styles. In this unit, wall plug elements 12 are detachably and interchangeably installed on the charging unit 10 by a latch mechanism 14. The plug element 12 may be released from the charging unit 10 by pressing a release button 16. Electrical contacts on the back of the plug element 12 (not shown) engage corresponding electrical contacts 18 in the body of the charger 10.

The charger 10 is designed to plug directly into an electrical outlet 20. Different plug elements 12 may be utilized with the charging unit 10 by removing and replacing the plug element 12 with another. For example, a standard two-blade North American plug can be removed and replaced with a European plug having two cylindrical prongs. The circuitry within the charging unit 10 senses the voltage and frequency differences from country to country, and adjusts automatically. Such a charger 10 allows the manufacturer to sell the unit in a variety of countries by packaging the unit 10 with a different plug element 12 for each country. Alternatively, a kit that includes different plug elements 12 may be sold with the unit 10 so that the user may use the unit 10 in different countries. An output assembly 22, such as a USB connector 24 and cord 26 may be coupled to the charging unit 10 for charging an electronic device or battery at a location remote from the charging unit 10.

SUMMARY

In accordance with the teachings described herein, a battery charging assembly for charging a battery of a mobile device comprises a charging unit, an output assembly, and a first input assembly. The charging unit has a power converter for converting an input voltage to a desired output voltage and at least one electrical contact for receiving the input voltage. The output assembly is coupled to the charging unit for charging a battery of a mobile device. The first input assembly is detachably associated with the charging unit and comprises an adapter for removable attachment to the charging unit, a power cord, and a plug configured to mate with a style of electrical outlet such that the charging unit is positionable at a remote location from the electrical outlet. The adapter has at least one electrical contact for mating with the at least one electrical contact of the charging unit.

A second input assembly may also be provided that is interchangeable with the first input assembly. The second input assembly comprises a second input assembly adapter for removable attachment to the charging unit. The second input assembly adapter includes a plug configured to mate with an electrical outlet such that the charging unit is positionable adjacent an electrical outlet when the second input assembly adapter is installed. The output assembly may comprise a USB connector, with a cord connected to the USB connector.

The charging unit may include a socket and the adapter is configured to detachably mate with the socket. A latch mechanism may also be provided to removably latch the adapter in the socket. The power cord, adapter and plug may be integral. Alternatively, the power cord, adapter, and plug may comprise separate parts that are configured to mate together.

In another embodiment, a battery charging apparatus for use in charging an electronic device comprises a charging unit, an output assembly, and a set of input assemblies. The charging unit has a power converter and a socket having at least one electrical contact. The output assembly is coupled to the charging unit for charging a battery of an electronic device. Each input assembly of the set of input assemblies is configured for individual detachable association with the socket of the charging unit. Each input assembly comprises an adapter for removable attachment within the socket, a power cord, and a plug configured to mate with a style of electrical wall socket. Each plug is configured to mate with a different style of electrical wall socket. The adapter has at least one electrical contact for mating with the at least one electrical contact of the socket.

In yet another embodiment, an adapter for coupling a power cord to a receptacle associated with a power converter comprises a body member configured to seat in a receptacle. The body member has at least one electrical contact for mating with an electrical contact positioned in a receptacle. The body member includes a latching mechanism for latching the body member into a receptacle. In addition, the body member is configured to attach to a power cord and plug.

In one embodiment, the latching mechanism comprises a recess defined in the body member and configured to receive an arm. In another embodiment, the latching mechanism comprises a pair of spring clips configured to engage a post defined in a receptacle. In yet another embodiment, the latching mechanism comprises a pair of guide bars configured to engage a post positioned in a receptacle and a pair of detents positioned on opposite sides of the body member. The detents are configured to engage spring biased ball bearings that are positioned on a receptacle. The latching mechanism may also include a release mechanism, such as a push button or plunger.

In a further embodiment, a battery charging assembly for charging a mobile device comprises a charging unit, an input assembly, and an output assembly. The charging unit has a power converter for converting an input voltage to a desired output voltage and at least one electrical contact for receiving the input voltage. The input assembly is coupled to the charging unit for providing the input voltage to the charging unit.

The output assembly is coupled to the charging unit for charging a mobile device at a remote location from the charging unit.

In one embodiment, the output assembly comprises a USB connector and a power cable. In another embodiment, the output assembly comprises a mini USB connector coupled to a USB A connector via a mini USB to USB A cable.

DETAILED DESCRIPTION

With reference now to the drawings, FIGS. 4-26 include various views of an example battery charging assembly 30 that includes an adapter 32 that provides for usage of the assembly in a number of different countries. In addition, the example assembly 30 allows for a charging unit 34 to be positioned at a remote location from an electrical outlet 20, and provides an output assembly 36 that allows for charging of the battery of an electronic device at a remote location from the charging unit 34. The terms "electronic device" and "mobile device" are used herein to generically refer to a mobile communication device, such as a mobile station, cellular telephone, wireless personal digital assistant (PDAs), two-way paging device, or other electronic device.

The example battery charging assembly 30 may be utilized interchangeably with an input assembly 38 that allows for remote positioning of the battery charging assembly 30 relative to an electrical outlet 20, or with a plug adapter 12 that can be coupled to the charging unit 34 to attach the charging unit 34 directly to a wall outlet 20. A known charging unit having a receptacle for receiving an adapter is manufactured by Phihong USA, among other known manufacturers, the claims not being limited to a particular type of charging unit.

The charging unit 34 is a device that is used to charge a battery of an electronic device. In a preferred embodiment, the charging unit 34 includes a power converter for converting an input voltage from an electrical outlet 20 to an output voltage that is useable by the electronic device. The power converter may include a fuse, an input source, an electrical filter, a transformer, a top switch feedback loop, an output-rectified filter, a DC-DC converter, an AC-AC converter, an AC-DC converter, an output filter, and/or a voltage and current feedback controller, among other known power converters. The power converter is configured to allow for usage of the charging unit 34 in different countries, and includes circuitry to convert the input voltage to an output voltage that is acceptable for charging a battery of an electronic device.

In a preferred embodiment, the charging unit 34 includes electrical contacts for charging an individual battery or a mobile device having a battery directly in a docking station 40 of the charging unit 34. In addition, the charging unit 34 includes an output assembly 36 that allows for remote charging of an electronic device. Therefore, the charging unit 34 allows for the charging of a battery and a mobile device at the same time, with the battery being positioned in the docking station 40 of the charging unit 34 and the mobile device being coupled to the output assembly 36.

FIGS. 4-7 depict a first embodiment of the example battery charging assembly 30. The assembly 30 includes a charging unit 34, an input assembly 38, and an output assembly 36. The charging unit 34 includes a receptacle 42 for receiving the input assembly 38. The input assembly 38 includes an adapter 32 having a body member that is configured to mate with the receptacle 42, a power cord 44, and a plug 46 (shown in FIG. 8). The plug 46 is configured to mate with a style of electrical outlet 20, such as a North American or European style, among other known styles. In a preferred embodiment, the receptacle is a socket 42 that is recessed into the surface of the charging unit 34 and the adapter 32 is a body member in the shape of a flat plug. When the adapter 32 is positioned in the socket 32, a smooth bottom surface of the charging unit 34 is provided. This allows for positioning the charging unit 34 on a table top 48, for example.

The output assembly 36, depicted in FIGS. 4-7, preferably includes a USB connector 50 at one end and a second connector 52, such as a USB connector, at the other end. The second connector 52 couples a cord 54 to the charging unit 34. Other types of connectors may alternatively be utilized in some embodiments of the example battery charging assembly 30. In a preferred embodiment, the output assembly 36 includes a mini USB connector 50, a USB A connector 52, and power cable 54 coupled between the connectors. The charging unit 34 includes a port 56 for accepting the USB A connector (shown, for example, in FIG. 12), and also includes circuitry for providing power through the mini USB connector 50. The charging unit 34 also includes a recess or docking station 40 for accepting a battery or an electronic device directly in the unit 34 for direct charging of the battery. The recess 40 in the charging unit 34 preferably includes electrical contacts for mating with electrical contacts on the battery or electronic device and for transferring power from the charging unit 34 to the battery or device.

Figures 4, 5, 6:
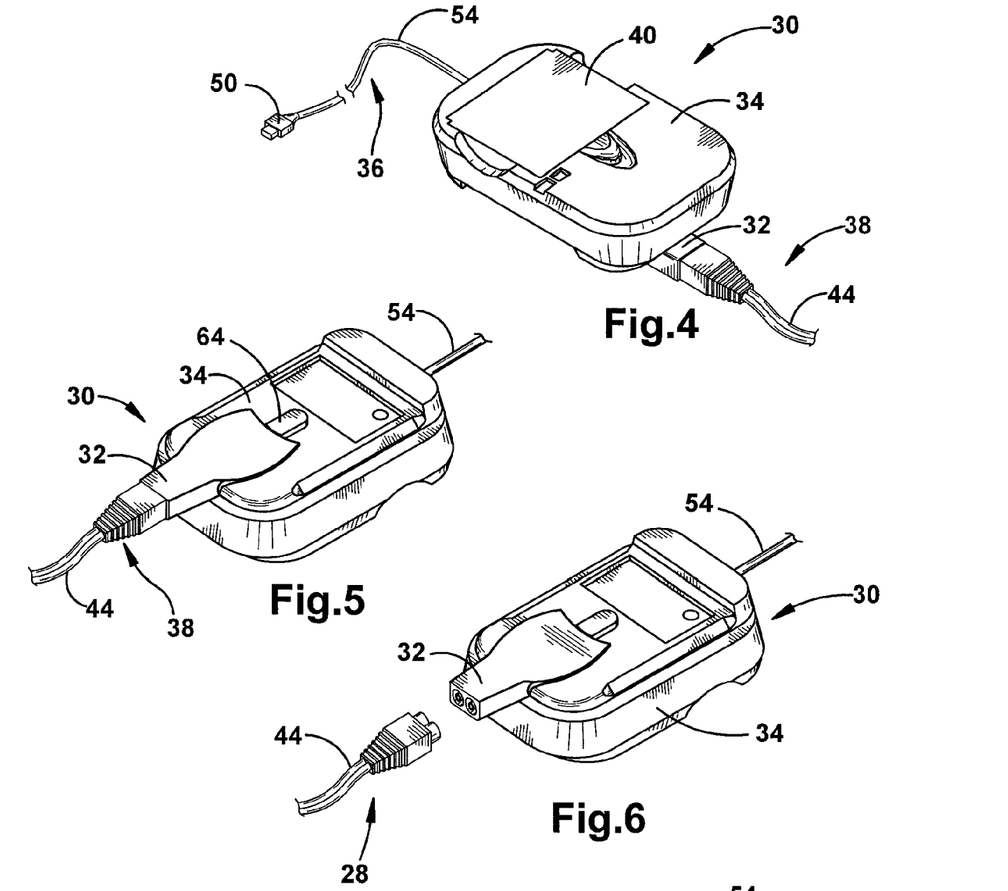
FIG. 4 is a perspective top view of an example battery charging unit.
FIG. 5 is a perspective bottom view of the example battery charging unit of FIG. 4.
FIG. 6 is a perspective top view of another embodiment of the example battery charging unit.
Figure 7:
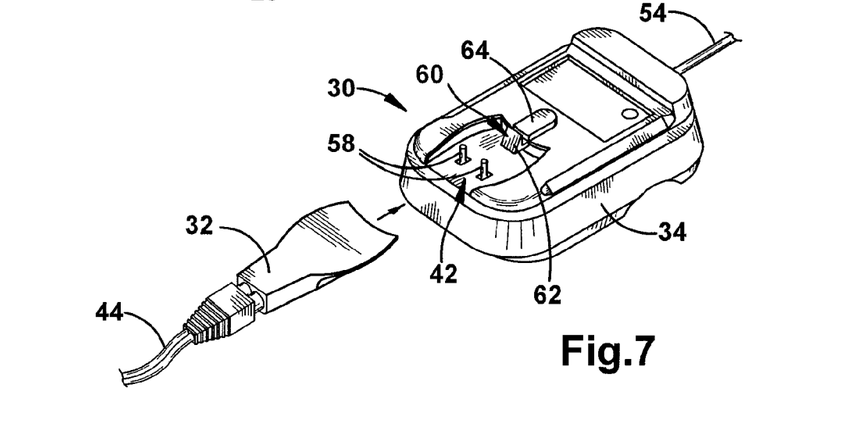
FIG. 7 is an exploded perspective bottom view of the battery charging unit shown in FIG. 6.

FIGS. 4 and 5 depict a first embodiment of the input assembly 38, where the adapter 32, power cord 44, and plug 46 are integral with one another to form a single part. FIGS. 6 and 7 depict an input assembly 38 that includes an adapter 32 that is separate from the power cord 44 and plug 46. In this embodiment, the adapter 32 includes a C-8 style connector for coupling with a C-8 style power cord connector. Other types of connectors may alternatively be utilized. As shown in FIG. 7, the charging unit includes electrical contacts 58 for mating with electrical contacts on the adapter 32. In addition, the adapter 32 is sized and shaped to seat in the socket 42.

A latching mechanism 60 is provided on the charging unit 34 for latching the adapter 32 in position. The latching mechanism 60 includes an arm 62 that is configured to engage a recess (not shown) defined in the adapter 32. The adapter 32 is released from the socket 42 by pressing a release button 64.

Figure 8:
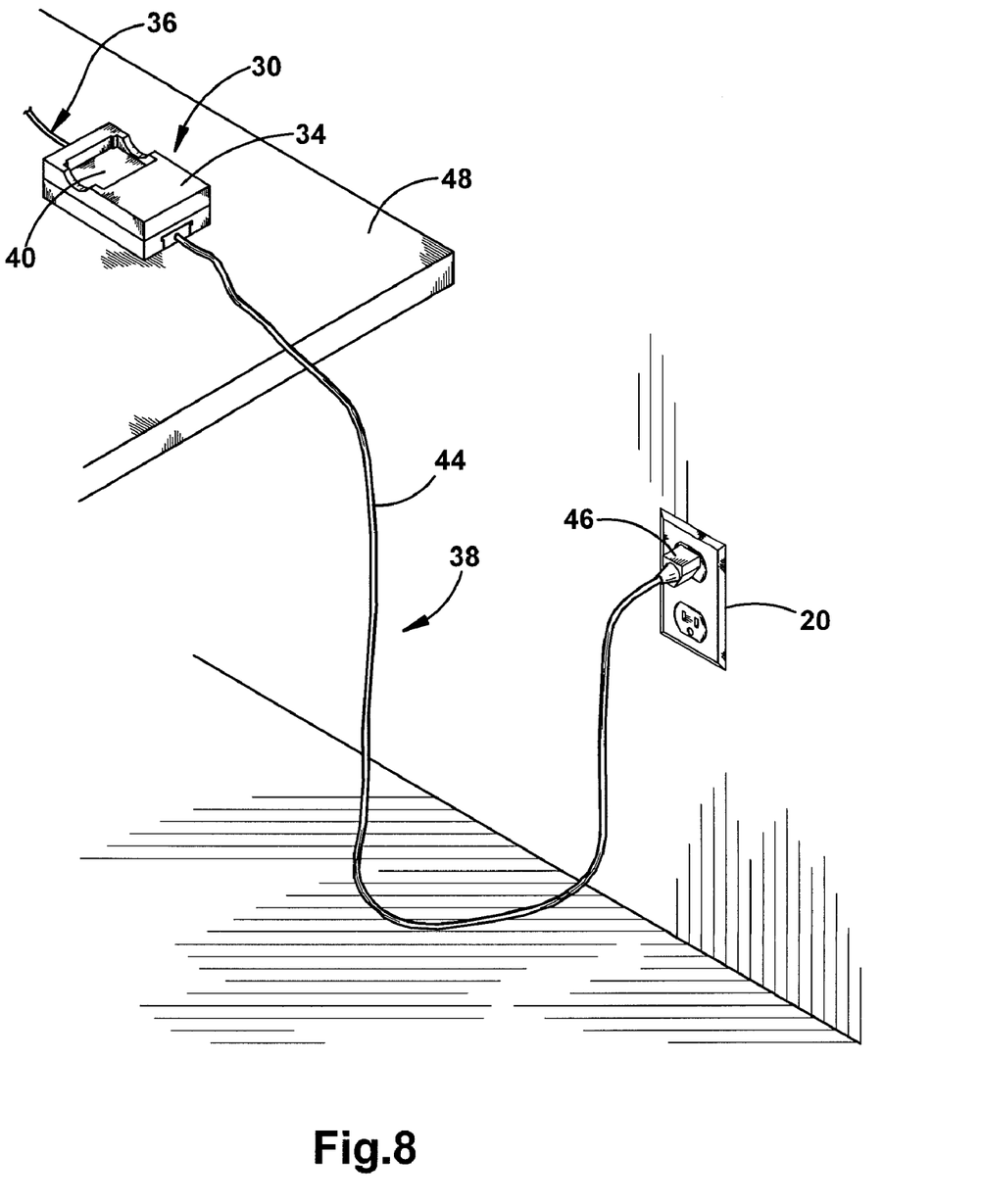
FIG. 8 is a perspective view of an example battery charging unit installed in an electrical wall socket.
Figures 9, 10, 11, 12:
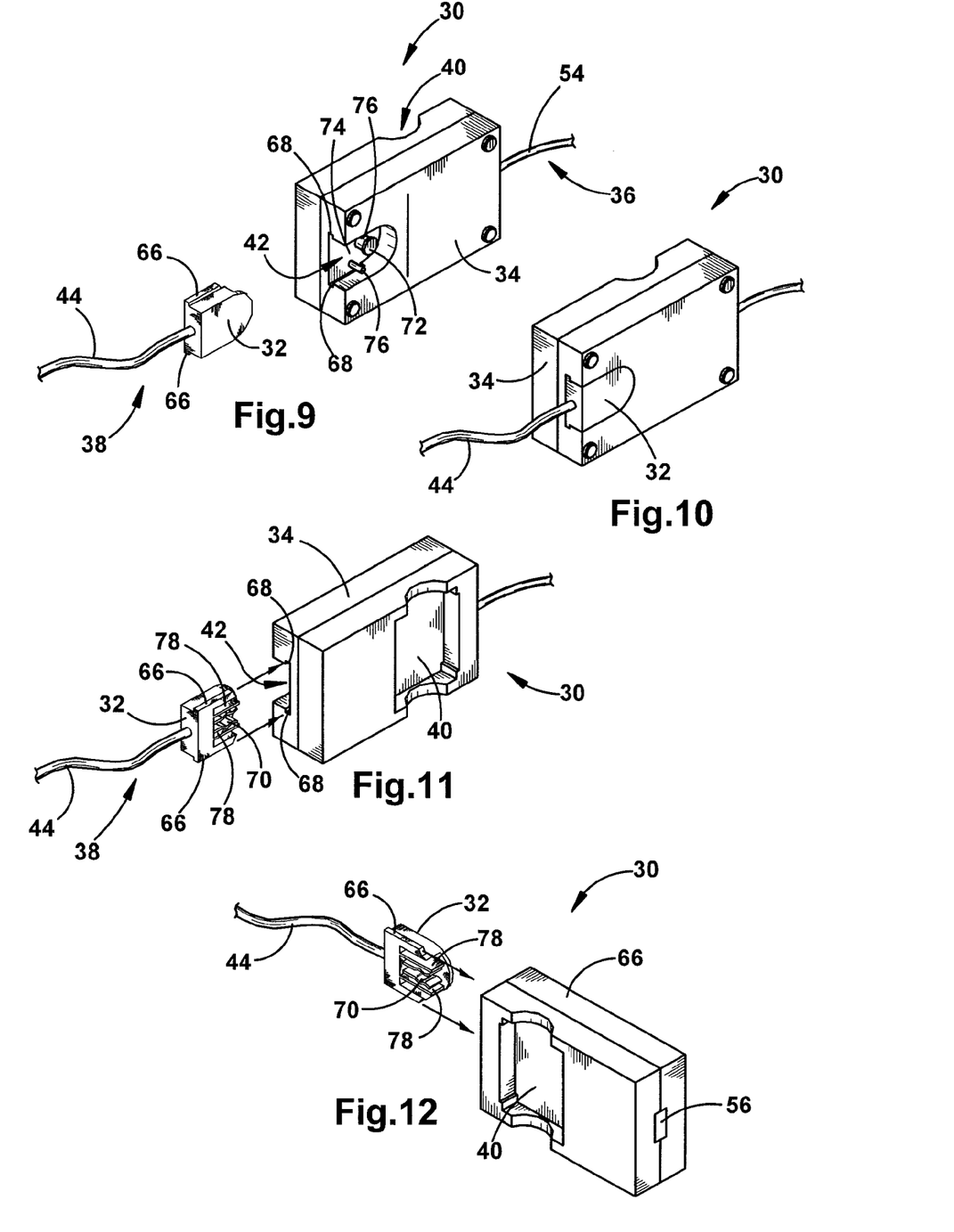
FIG. 9 is an exploded perspective bottom view of another embodiment of the example battery charging unit.
FIG. 10 is a perspective bottom view of the battery charging unit of FIG. 9 with the adapter installed in the socket.
FIG. 11 is an exploded perspective top view of the battery charging unit of FIG. 9.
FIG. 12 is another exploded perspective top view of the battery charging unit of FIG. 9.
Figure 13:
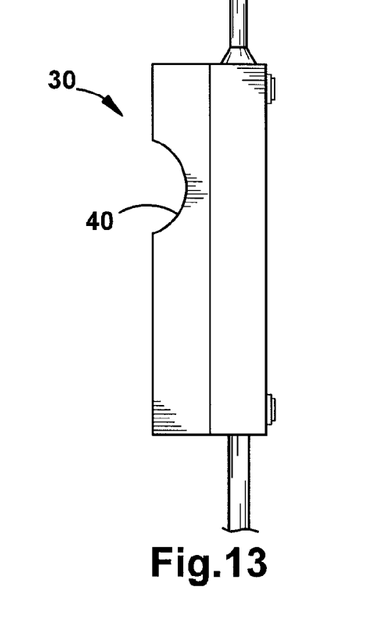
FIG. 13 is a side view of the battery charging unit of FIG. 9.
Figure 14:
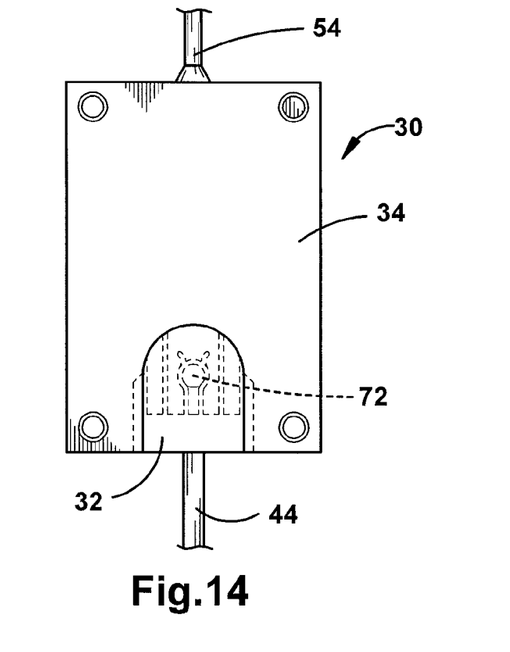
FIG. 14 is a bottom plan view of the battery charging unit of FIG. 9, showing internal surfaces in phantom.

FIG. 8 depicts the example charging unit 34 positioned on a table top 48 at a location that is remote from the electrical wall socket 20. As shown, the top of the charging unit 34 includes a docking station 40 for accepting a battery or mobile device for charging. In addition, an input assembly 38 includes a plug 46 configured to mate with a style of electrical outlet 20, a power cord 44, and an adapter 32 positioned on the bottom of the charging unit 34. In addition, an output assembly 36, including a cord 54, extends from the charging unit 34 for charging an electronic device at a location that is remote from the charging unit 34. As discussed above, in a preferred embodiment, a USB connector 50 is attached to the output cord 54.

FIGS. 9-16 depict another embodiment of the example battery charging assembly 30. The charging assembly 30 includes a charging unit 34, an input assembly 38, and an output assembly 36. The charging unit 34 includes a receptacle 42 in the form of a socket 42 for receiving the input assembly 38. The input assembly 38, as discussed above, includes a power cord 44, a plug 46, and an adapter 32. The adapter 32 is sized to seat in the socket 42.

Figures 15, 16:
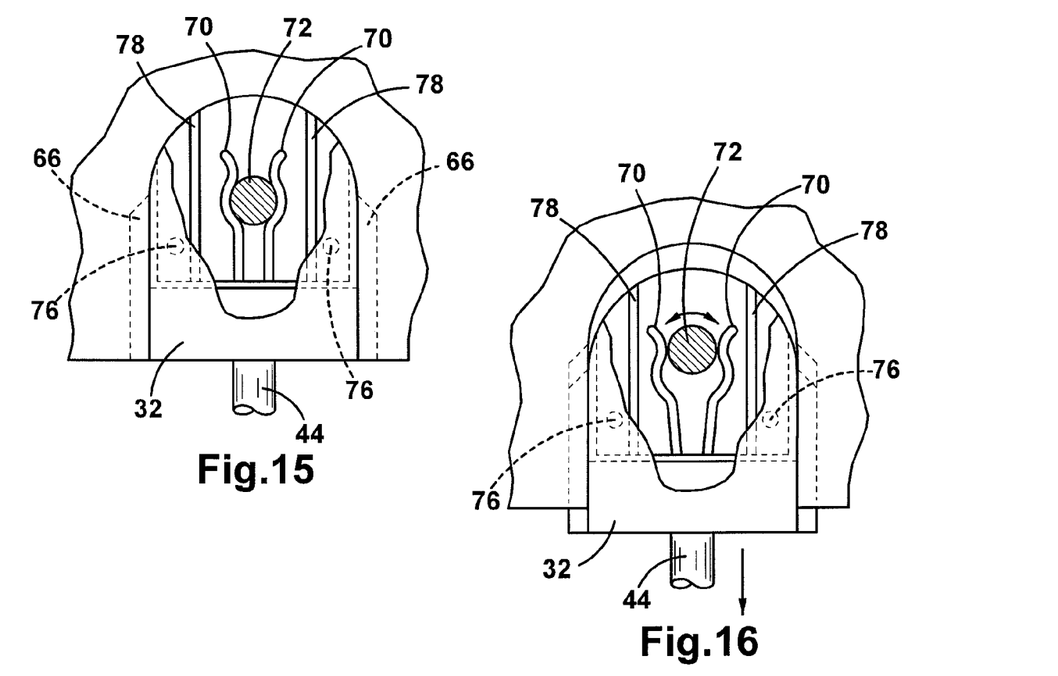
FIG. 15 is a partial bottom plan view of the battery charging unit of FIG. 9, showing the adapter partially cut away in an installed position.
FIG. 16 is a partial bottom plan view of the battery charging unit similar to FIG. 15, but with the adapter in a partially uninstalled position.
Figure 17:
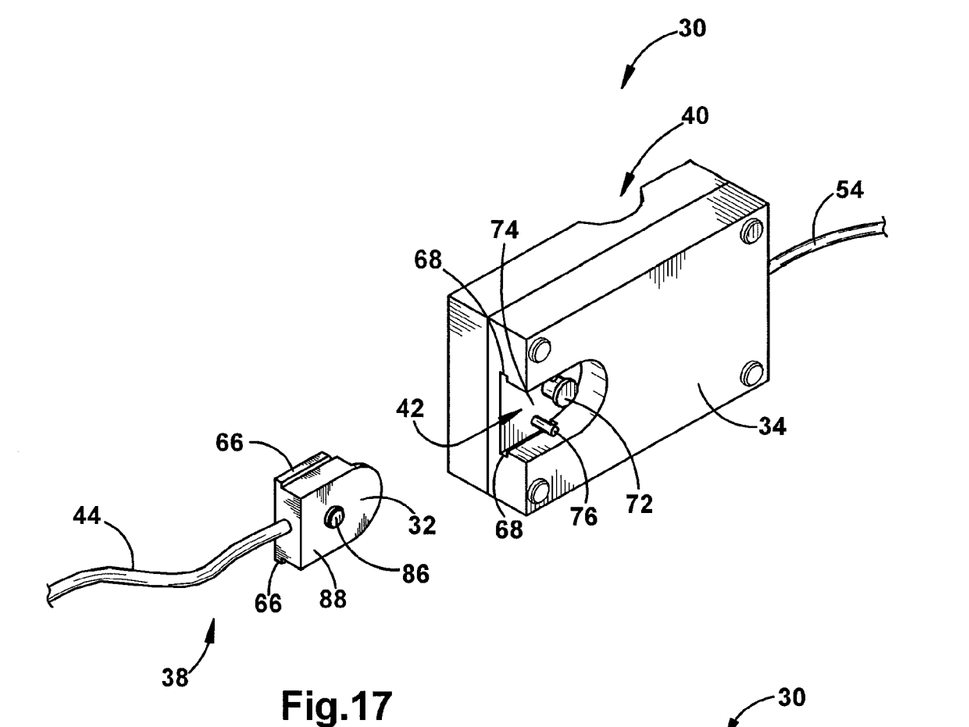
FIG. 17 is an exploded bottom perspective view of another embodiment of the example battery charging unit.
Figure 18:
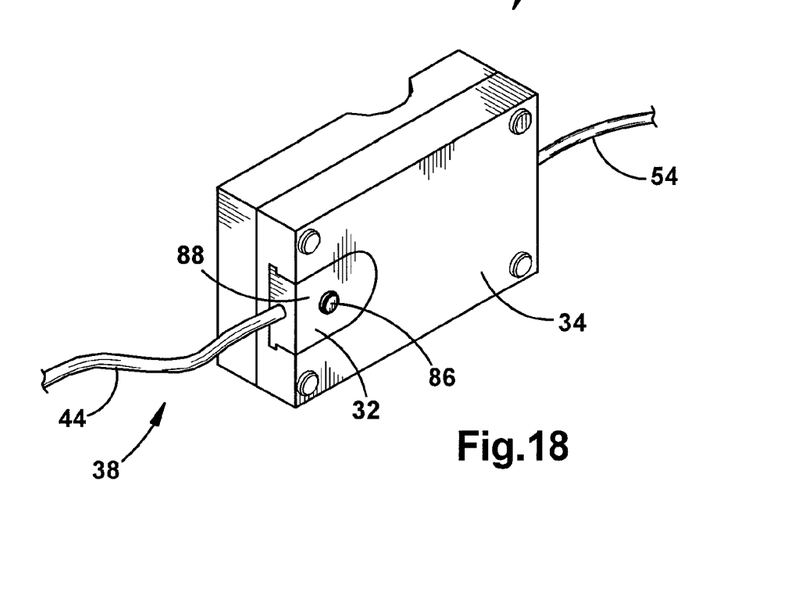
FIG. 18 is a bottom perspective view of the battery charging unit of FIG. 17 with the adapter installed in the battery charging unit.

As shown in FIGS. 9-12, the adapter 32 includes a latching mechanism for latching the adapter 32 to the socket 42. The adapter 32 is configured to slide longitudinally into the socket 42 and includes legs 66 that are configured to engage channels 68 defined on the side of the socket 42. The interaction of the legs 66 and channels 68 helps to maintain the adapter 32 in the socket 42 and to prevent transverse movement of the adapter 32 relative to the socket 42. In addition, the adapter 32 includes a pair of spring arms 70 that are configured to engage a contact post 72 that extends transversely outwardly from an inner surface 74 of the socket 42. The spring arms 70 and contact post 72 also help to maintain the adapter 32 in the socket 42 and deter longitudinal movement of the adapter 32 relative to the socket 42 when in the installed position, shown in FIG. 15. In addition, the socket 42 includes two guide pins 76 that are positioned adjacent to, but spaced from the contact post 72. The guide pins 76 interact with longitudinal walls 78 defined on the adapter 32 to guide the spring arms 70 around the contact post 72. In addition, the guide pins 76 may serve as electrical contacts for mating with electrical contacts on the adapter 32 to transfer power from the input assembly 38 to the charging unit 34. Other positions for the electrical contacts may also be provided. Once installed, the adapter 32 is maintained in the socket 42 until the user applies a longitudinal force sufficient to move the spring arms 70 outwardly around the contact post 72, as shown in FIG. 16.

FIGS. 17-21 depict an alternative embodiment of the battery charging assembly 30 that includes a charging unit 34, an input assembly 38, and an output assembly 36. The charging unit 34 includes a receptacle in the form of a socket 42 for receiving the input assembly 38. The input assembly 38 includes an adapter 32, a power cord 44, and a plug 46 for mating with a style of electrical outlet 20. The adapter 32 includes a latching mechanism for latching the adapter 32 to the socket 42. The adapter 32 includes outwardly extending legs 66 and the socket 42 includes opposing channels 68 configured to accept the legs 66. The legs 66 and channels 68 combine to maintain the adapter 32 in the socket 42 and to deter transverse movement of the adapter 32 from the socket 42.

Figure 19:
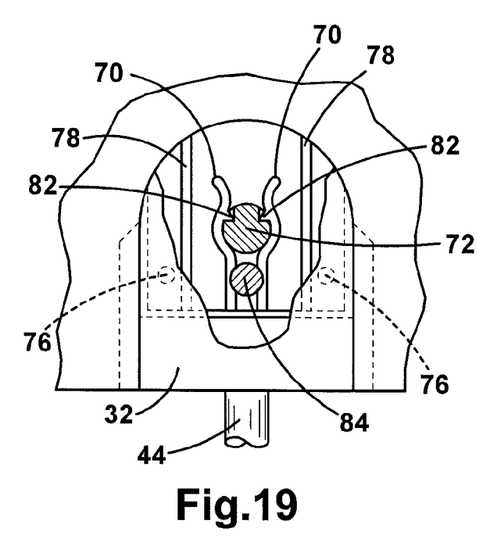
FIG. 19 is a partial bottom plan view of the battery charging unit of FIG. 17, with the adapter partially cut away in an installed position.

The socket 42 also includes an outwardly extending contact post 72 and two outwardly extending guide pins 76 that are positioned on opposing sides of the contact post 72. The contact post 72 includes a pair of recesses 80, one on each side of the post 72. The adapter 32 includes a pair of spring arms 70 that are configured to engage the contact post 72. The spring arms 70 each include inwardly extending protrusions 82 that are configured to engage the recesses 80 on the contact post 72. When the adapter 32 is in an installed position, as shown in FIG. 19, the protrusions 82 engage the recesses 80 on the contact post 72 to lock the adapter 32 in position within the socket 42 and to deter longitudinal movement of the adapter 32 relative to the socket 42. The guide pins 76 interact with longitudinal walls 78 defined on the adapter 32 to guide the spring arms 70 around the contact post 72. In addition, the guide pins 76 may serve as electrical contacts which are configured to engage opposed electrical contacts on the adapter 32. The electrical contacts are for transferring power from the input assembly 38 to the charging unit 34. Other positions for the electrical contacts may also be provided.

Figure 20:
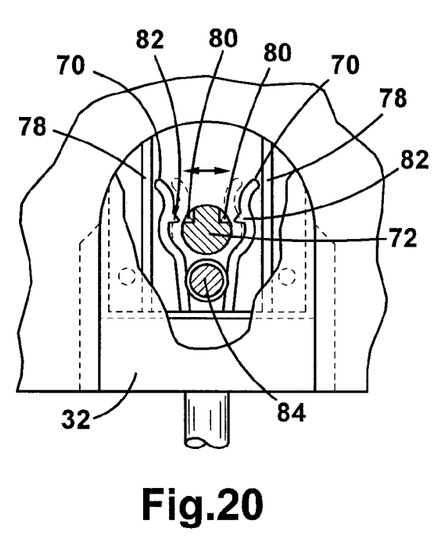
FIG. 20 is a partial bottom plan view similar to that of FIG. 19, but with the adapter in a partially installed position.
Figure 21:
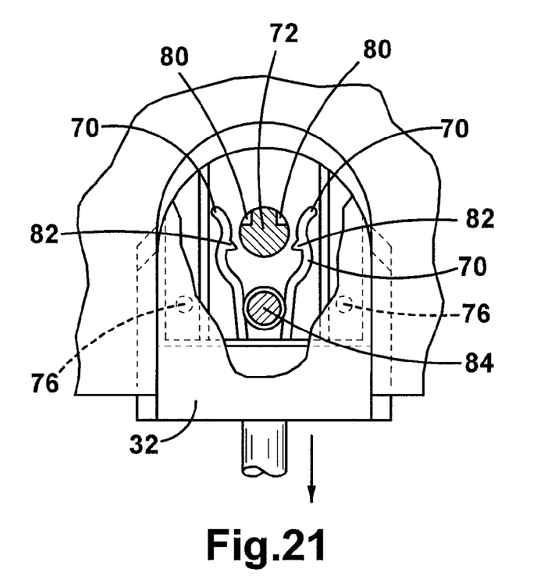
FIG. 21 is a partial bottom plan view similar to that of FIG. 19, but with the adapter in a partially installed position.
Figure 22:
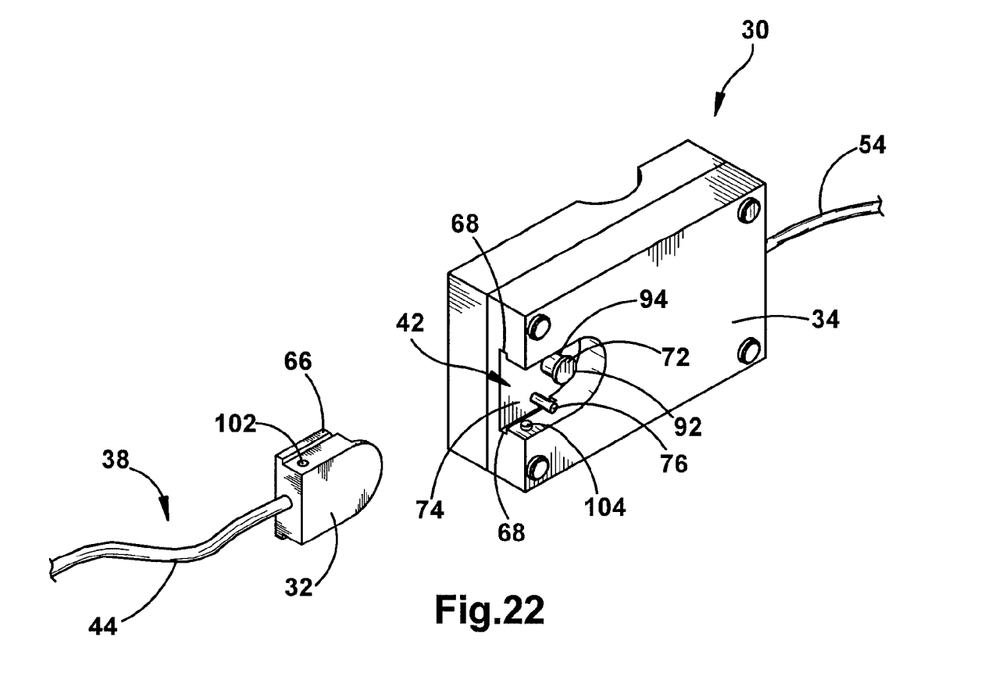
FIG. 22 is an exploded bottom perspective view of yet another embodiment of the example battery charging unit.
Figure 23:
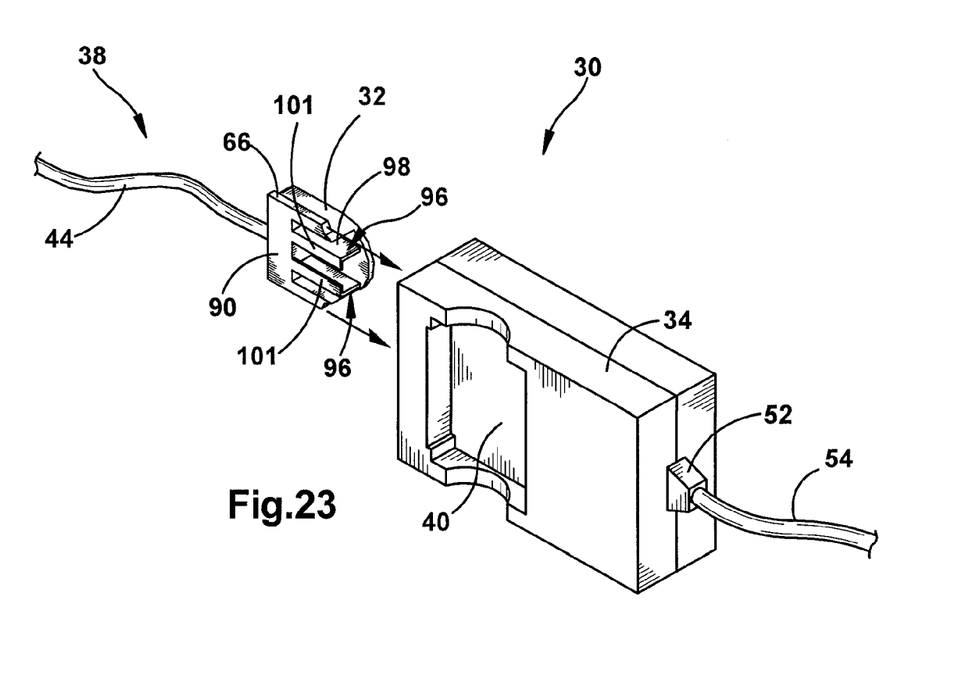
FIG. 23 is an exploded top perspective view of the battery charging unit of FIG. 22.
Figure 24:
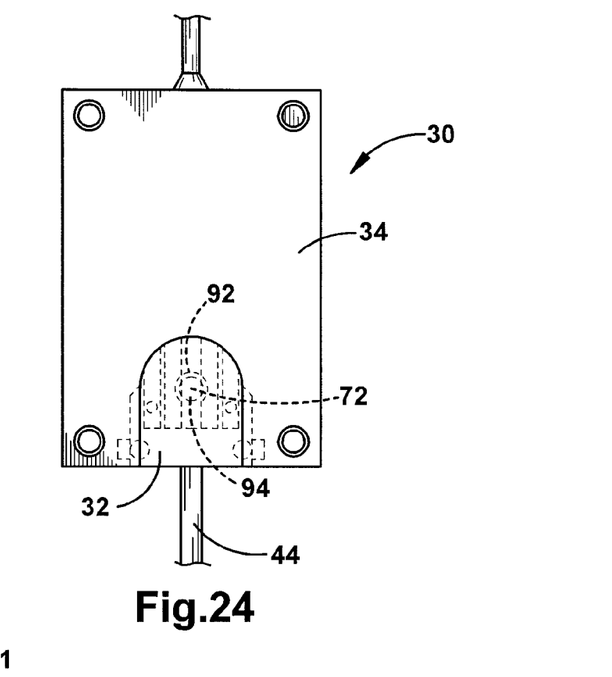
FIG. 24 is a bottom plan view of the battery charging unit of FIG. 22 showing internal parts in phantom.
Figure 25:
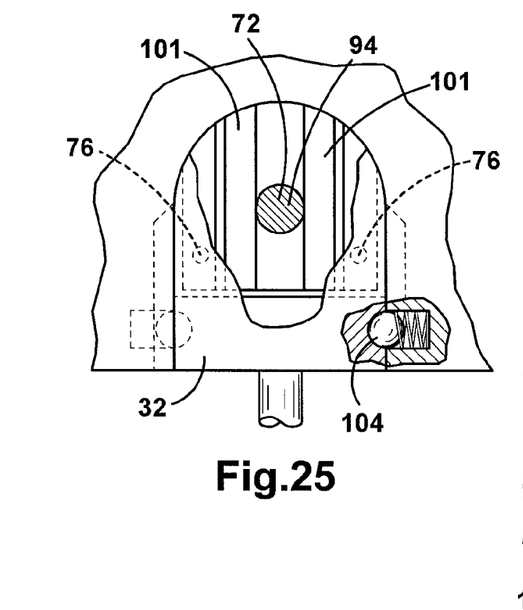
FIG. 25 is a partial bottom plan view of the battery charging unit of FIG. 22 showing the adapter partially cut away in an installed position.

In addition, the adapter 32 includes a plunger 84 that is positioned between the two spring arms 70. The plunger 84 extends transversely through the adapter 32 and includes a button 86 that is positioned on the outer surface 88 of the adapter 32. The plunger 84 is tapered from a larger cross-section at the outer surface 88 of the adapter 32 to a smaller cross-section at the inner side 90 of the adapter 32 (the side that faces the socket 42). The user depresses the plunger 84 to release the spring arms 70 from the contact post 72 and to allow the adapter 32 to be moved longitudinally relative to the charging unit 34. When depressed, the larger cross-section of the plunger 84 moves against the spring arms 70 to spread them apart, which, in turn, releases the protrusions 82 from the recesses 80 defined in the contact post 72. When the plunger 84 is depressed a sufficient amount, the spring arm protrusions 82 are cleared from the recesses 80 of the contact post 72 to allow the user to slide the adapter 32 out of the socket 42, as shown in FIGS. 20-21.

FIGS. 22-26 depict yet another embodiment of the battery charging assembly 30 that includes a charging unit 34, an input assembly 38, and an output assembly 36. The charging unit 34 includes a receptacle in the form of a socket 42 for receiving the input assembly 38. The input assembly 38 includes an adapter 32, a power cord 44, and a plug 46 for mating with a style of electrical outlet 20. The adapter 32 includes a latching mechanism for latching the adapter to the socket 42. The adapter 32 includes outwardly extending legs 66 and the socket 42 includes opposing channels 68 configured to accept the legs 66. The legs 66 and channels 68 combine to maintain the adapter 32 in the socket 42 and to deter transverse movement of the adapter 32 from the socket 42.

The socket 42 also includes an outwardly extending contact post 72 and two guide pins 76 that are positioned on opposing sides of the contact post 72. The contact post 72 includes a head portion 92 and a shaft portion 94. The shaft portion 94 extends outwardly from the inner surface 74 of the socket 42, and the head portion 92 is connected to the shaft portion 94. The head portion 92 has a larger diameter than the shaft portion 94 of the contact post 72. The adapter 32 includes a pair of guide bars 96 that are configured to engage the shaft of the contact post 72 directly beneath the head 92 of the contact post 72. The guide bars 96 extend longitudinally and have an L-shaped cross-section. A first part 98 of the L extends transversely outwardly from an inner surface 90 of the adapter 32, and a second part 101 of the L extends transversely inwardly from the first part 98 of the L. The second part 101 of the L-shaped member engages the shaft 94 of contact post 72. And the adapter 32 is deterred from transverse movement relative to the contact post 72 by the blocking action of the head 92 of the contact post 72 relative to the second leg 101 of the L-shaped guide bars 96. The guide pins 76 interact with the outer side of the first part 98 of the L-shaped guide bars 96, to assist in guiding the adapter 32 into the socket 42.

Figure 26:
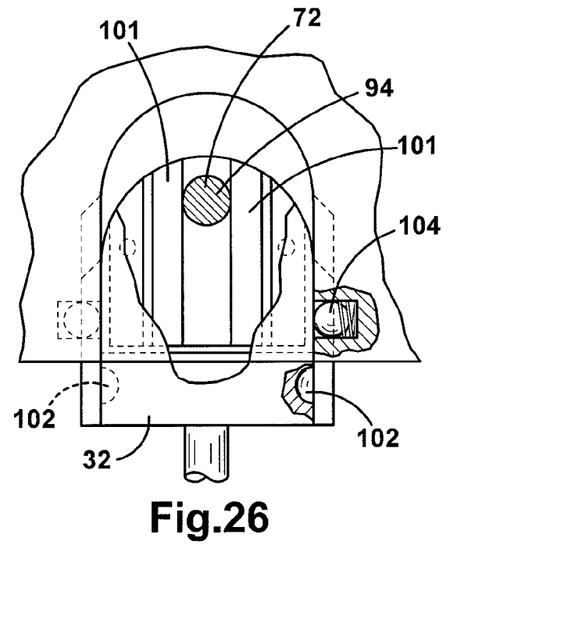
FIG. 26 is a partial bottom plan view similar to FIG. 25, but with the adapter in a partially installed position.

In addition, the adapter 32 includes an additional latching mechanism in the form of a pair of detents 102 that are configured to engage spring-biased ball bearings 104 positioned on the sides of the socket 42. The detents 102, in combination with the spring-biased ball bearings 104, assist in maintaining the adapter 32 in the socket 42 to deter longitudinal movement of the adapter 32 relative to the socket 42. The user may remove the adapter 32 from the socket 42 by exerting a force that is sufficient to move the detents 102 away from the ball bearings 104, as shown in FIG. 26.

The battery charging assembly 30 may be provided with a plurality of input assemblies 38 or adapters 32, such as in a kit that includes adapters 32 for a variety of countries. Alternatively, users may purchase individual input assemblies 38 or adapters 32 for different countries depending upon their travel plans.

Figure 27:
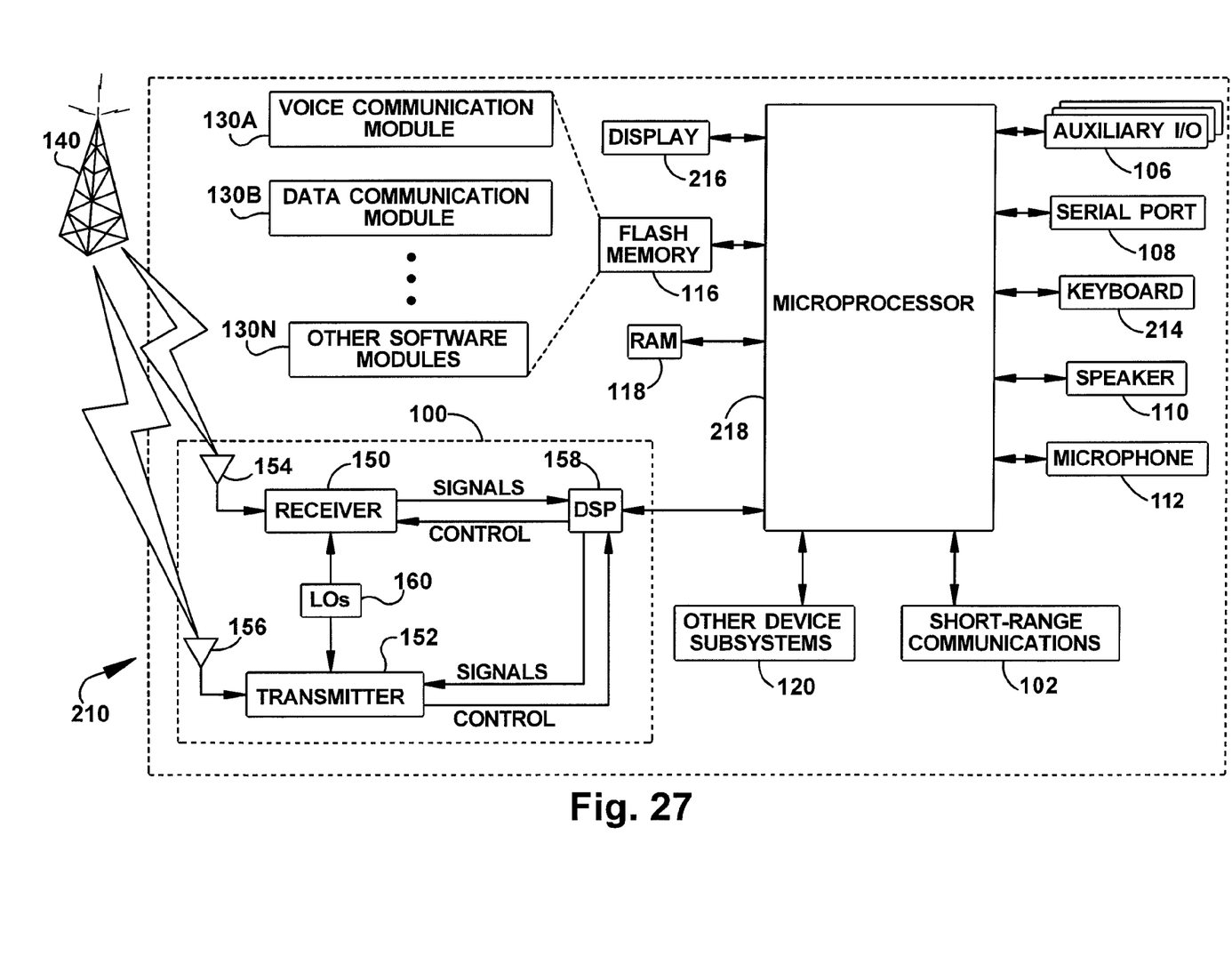
FIG. 27 is a block diagram illustrating an example mobile communication device.

FIG. 27 is a schematic diagram of an exemplary mobile communication device that has an industry standard interface. The mobile communication device is preferably a two-way communication device having at least voice or data communication capabilities. Preferably, the mobile device is also capable of communicating over the Internet, for example, via a radio frequency ("RF") link. Examples of types of devices that could be classified as a mobile communication device including a data messaging device, a two-way pager, a cellular telephone with or without data messaging capabilities, a wireless Internet appliance, a data communication device (with or without telephony capabilities), a personal digital assistant ("PDA"), a wireless two-way e-mail communication device, and others. The example battery charging assembly 30 is utilized to charge a mobile communication device or a battery for a mobile communication device, among other electrical devices.

Handheld mobile communication devices 210 include similar features, such as a housing 226, a keyboard 214 and a display 216. The display 216 is preferably a full graphic LCD. Other types of output devices may alternatively be utilized. A processing device 218, which is shown schematically in FIG. 27, is contained within the housing 226 and is coupled between the keyboard 214 and the display 216. The processing device 218 controls the operation of the display 216, as well as the overall operation of the mobile communication device 210, in response to actuation of keys on the keyboard 214 by the user.

The housing 226 may be elongated vertically, or may take on other sizes and shapes. The keyboard may include a mode selection key, or other hardware or software for switching between text entry and telephony entry.

In addition to the processing device 218, other parts of the mobile communication device 210 are shown schematically in FIG. 27. These include a communications subsystem 100; a short-range communications subsystem; the keyboard 214 and the display 216, along with other input/output devices 106, 108, 110 and 112; as well as memory devices 116, 118 and various other device subsystems 120. The mobile communication device 210 is preferably a two-way RF communication device having voice and data communication capabilities. In addition, the mobile communication device 210 preferably has the capability to communicate with other computer systems via the Internet.

Operating system software executed by the processing device 218 is preferably stored in a persistent store, such as a flash memory 116, but may be stored in other types of memory devices, such as a read only memory (ROM) or similar storage element. In addition, system software, specific device applications, or parts thereof, may be temporarily loaded into a volatile store, such as a random access memory (RAM) 118. Communication signals received by the mobile communication device may also be stored to the RAM 118.

The processing device 218, in addition to its operating system functions, enables execution of software applications 130A-130N on the device 210. A predetermined set of applications that control basic device operations, such as data and voice communications 130A and 130B, may be installed on the device 210 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 140. Preferably, the PIM data items are seamlessly integrated, synchronized and updated via the wireless network 140 with the device user's corresponding data items stored or associated with a host computer system. An example system and method for accomplishing these steps is disclosed in "System And Method For Pushing Information From A Host System To A Mobile Device Having A Shared Electronic Address," U.S. Pat. No. 6,219,694, which is owned by the assignee of the present application, and which is incorporated herein by reference.

Communication functions, including data and voice communications, are performed through the communication subsystem 100, and possibly through the short-range communications subsystem. The communication subsystem 100 includes a receiver 150, a transmitter 152, and one or more antennas 154, 156. In addition, the communication subsystem 100 also includes a processing module, such as a digital signal processor (DSP) 158, and local oscillators (LOs) 160. The specific design and implementation of the communication subsystem 100 is dependent upon the communication network in which the mobile communication device 210 is intended to operate. For example, a mobile communication device 210 may include a communication subsystem 100 designed to operate with the Mobitex™, DataTAC™ or General Packet Radio Service (GPRS) mobile data communication networks and also designed to operate with any of a variety of voice communication networks, such as AMPS, TDMA, CDMA, PCS, GSM, etc. Other types of data and voice networks, both separate and integrated, may also be utilized with the mobile communication device 210.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile communication device 210 may send and receive communication signals over the communication network 140. Signals received from the communication network 140 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 140 are processed (e.g. modulated and encoded) by the DSP 158 and are then provided to the transmitter 152 for digital to analog conversion, frequency up conversion, filtering, amplification and transmission to the communication network 140 (or networks) via the antenna 156.

In addition to processing communication signals, the DSP 158 provides for control of the receiver 150 and the transmitter 152. For example, gains applied to communication signals in the receiver 150 and transmitter 152 may be adaptively controlled through automatic gain control algorithms implemented in the DSP 158.

In a data communication mode, a received signal, such as a text message or web page download, is processed by the communication subsystem 100 and is input to the processing device 218. The received signal is then further processed by the processing device 218 for an output to the display 216, or alternatively to some other auxiliary I/O device 106. A device user may also compose data items, such as e-mail messages, using the keyboard 214 and/or some other auxiliary I/O device 106, such as a touchpad, a rocker switch, a thumbwheel, or some other type of input device. The composed data items may then be transmitted over the communication network 140 via the communication subsystem 100.

In a voice communication mode, overall operation of the device is substantially similar to the data communication mode, except that received signals are output to a speaker 110, and signals for transmission are generated by a microphone 112. Alternative voice or audio I/O subsystems, such as a voice message recording subsystem, may also be implemented on the device 10. In addition, the display 216 may also be utilized in voice communication mode, for example to display the identity of a calling party, the duration of a voice call, or other voice call related information.

The short-range communications subsystem enables communication between the mobile communication device 210 and other proximate systems or devices, which need not necessarily be similar devices. For example, the short-range communications subsystem may include an infrared device and associated circuits and components, or a Bluetooth™ communication module to provide for communication with similarly-enabled systems and devices.

While various features of the claimed embodiments are presented above, it should be understood that the features may be used singly or in any combination thereof. Therefore, the claimed embodiments are not to be limited to only the specific embodiments depicted herein.

Further, it should be understood that variations and modifications may occur to those skilled in the art to which the claimed embodiments pertains. The embodiments described herein are exemplary. The disclosure may enable those skilled in the art to make and use embodiments having alternative elements that likewise correspond to the elements recited in the claims. The intended scope may thus include other embodiments that do not differ or that insubstantially differ from the literal language of the claims. The scope of the example embodiments is accordingly defined as set forth in the appended claims.

What is claimed is:

1. An adapter for coupling a power cord to a receptacle of a battery charging assembly associated with a power converter, said adapter comprising:
   a body member configured to detachably seat in the receptacle of the battery charging assembly and having at least one electrical contact for mating with an electrical contact positioned in the receptacle, said body member including means for latching the body member into the receptacle, said adapter being configured to attach to a power cord and plug, wherein the means for latching is a latching mechanism and
   the latching mechanism comprises a pair of spring clips configured to engage a post defined in the receptacle.

2. The adapter of claim 1, further comprising at least one longitudinally extending guide bar extending along at least part of the length of the body member for moving against a corresponding guide pin defined in the receptacle when the body member is slid into the receptacle.

3. The adapter of claim 1, wherein the post has a profile that varies from a smaller diameter at the base to a larger diameter at the upper end and the post is depressible into the battery charging assembly, and wherein when the post is depressed, it acts against the pair of spring clips to move them away from each other in order to allow the release of the body member from the receptacle.

4. The adapter of claim 1, wherein each of the pair of spring clips includes an inwardly extending protrusion for mating with a corresponding recess defined on a post positioned in the receptacle.

5. The adapter of claim 4, further comprising a plunger positioned between the pair of spring clips, said plunger being movable vertically relative to the spring clips and having a contour that spreads the spring clips apart when moved vertically.

6. The adapter of claim 1, wherein the body member has a substantially flat outer surface for mating with an exterior surface of the battery charging assembly to form an integral part of the exterior surface of the battery charging assembly.

7. The adapter of claim 1, further comprising at least one guide pin for guiding the body member into the receptacle.

8. An adapter for coupling a power cord to a receptacle of a battery charging assembly associated with a power converter, said adapter comprising:

a body member configured to detachably seat in the receptacle of the battery charging assembly and having at least one electrical contact for mating with an electrical contact positioned in the receptacle, said body member including means for latching the body member into the receptacle, said adapter being configured to attach to a power cord and plug, wherein the means for latching is a latching mechanism, and further comprising at least one guide pin for guiding the body member into the receptacle with the guide pin is positioned in the receptacle and further comprising at least one guide bar defined on the body member for interacting with the guide pin.

9. The adapter of claim 8, wherein the body member has a substantially flat outer surface for mating with an exterior surface of the battery charging assembly to form an integral part of the exterior surface of the battery charging assembly.

10. The adapter of claim 8, wherein the latching mechanism further comprises a release mechanism.

11. An adapter for coupling a power cord to a receptacle of a battery charging assembly associated with a power converter, said adapter comprising:

a body member configured to detachably seat in the receptacle of the battery charging assembly and having at least one electrical contact for mating with an electrical contact positioned in the receptacle, said body member including means for latching the body member into the receptacle, said adapter being configured to attach to a power cord and plug, wherein the means for latching is a latching mechanism and the latching mechanism comprises a pair of detents positioned on opposite sides of the body member, said detents being configured to engage spring biased ball bearings that are coupled to and are biased outwardly from the receptacle.

12. The adapter of claim 11, further comprising a pair of guide bars configured to engage a post positioned in the receptacle.

13. The adapter of claim 12, wherein the guide bars have an L-shaped cross-section, with one leg of the L configured to engage the post positioned in the receptacle.

14. The adapter of claim 11, wherein the latching mechanism further comprises a release mechanism.

15. The adapter of claim 14, wherein the release mechanism is a push button.

16. The adapter of claim 14, wherein the release mechanism is a plunger.

17. The adapter of claim 11, wherein the body member has a substantially flat outer surface for mating with an exterior surface of the battery charging assembly to form an integral part of the exterior surface of the battery charging assembly.

18. The adapter of claim 17, wherein the guide pin is positioned in the receptacle and further comprising at least one guide bar defined on the body member for interacting with the guide pin.

\* \* \* \* \*